(12) United States Patent
Kim et al.

(10) Patent No.: US 9,434,144 B2
(45) Date of Patent: Sep. 6, 2016

(54) PLATE STRUCTURE AND METHOD OF MANUFACTURING THE SAME

(71) Applicant: SAMSUNG DISPLAY CO., LTD., Yongin, Gyeonggi-Do (KR)

(72) Inventors: Yun Hak Kim, Yongin (KR); Seok Hoon Yoon, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/321,107

(22) Filed: Jul. 1, 2014

(65) Prior Publication Data

US 2015/0205022 A1 Jul. 23, 2015

(30) Foreign Application Priority Data

Jan. 23, 2014 (KR) .................. 10-2014-0008486

(51) Int. Cl.
*H01L 29/22* (2006.01)
*B32B 37/12* (2006.01)

(52) U.S. Cl.
CPC .... *B32B 37/1292* (2013.01); *B32B 2037/1253* (2013.01); *B32B 2310/0831* (2013.01); *B32B 2457/208* (2013.01); *Y10T 156/10* (2015.01); *Y10T 428/24777* (2015.01)

(58) Field of Classification Search
CPC .................. H01L 27/16618; H01L 51/5237; H01L 27/14618; H01L 33/52
USPC .......... 257/98, 100, 680, 432–434, E25.032
See application file for complete search history.

(56) References Cited

U.S. PATENT DOCUMENTS

| | | | |
|---|---|---|---|
| 6,809,413 B1* | 10/2004 | Peterson et al. | 257/680 |
| 2007/0164386 A1* | 7/2007 | Chang et al. | 257/434 |
| 2011/0114991 A1* | 5/2011 | Lee | H01L 51/5246 257/100 |
| 2011/0180893 A1* | 7/2011 | Minegishi et al. | 257/432 |
| 2011/0204465 A1* | 8/2011 | Meng | H01L 27/14618 257/434 |
| 2012/0187394 A1* | 7/2012 | Hatano | G09G 3/3208 257/43 |
| 2012/0313884 A1* | 12/2012 | Huang | G06F 3/0412 345/174 |
| 2012/0319222 A1* | 12/2012 | Ozawa | H01L 27/14605 257/432 |
| 2014/0331492 A1* | 11/2014 | Huang | G06F 3/0412 29/846 |

FOREIGN PATENT DOCUMENTS

| | | |
|---|---|---|
| KR | 10-2011-0100874 A | 9/2011 |
| KR | 10-1117399 B1 | 3/2012 |
| KR | 10-2012-0087889 A | 8/2012 |
| KR | 10-2013-0065242 A | 6/2013 |

* cited by examiner

*Primary Examiner* — Nitin Parekh
(74) *Attorney, Agent, or Firm* — Lee & Morse, P.C.

(57) ABSTRACT

A plate structure and method of manufacturing a plate structure, the plate structure including a first plate; an optical laminate on the first plate, the optical laminate including an optical plate on the first plate and a film dam along a top periphery of the optical plate; a second plate on the optical laminate; and a resin layer in a space provided by the film dam, the resin layer attaching the optical plate to the second plate.

11 Claims, 16 Drawing Sheets

PLATE STRUCTURE AND METHOD OF MANUFACTURING THE SAME

CROSS-REFERENCE TO RELATED APPLICATION

Korean Patent Application No. 10-2014-0008486, filed on Jan. 23, 2014, in the Korean Intellectual Property Office, and entitled: "Plate Structure and Method of Manufacturing the Same," is incorporated by reference herein in its entirety.

BACKGROUND

1. Field

Embodiments relate to a plate structure and a method of manufacturing the same.

2. Description of the Related Art

With the development of information society, various display panels such as a liquid crystal display (LCD) panel, an electrophoretic display (EPD) panel and an electrowetting display (EWD) panel have been used for a display device.

SUMMARY

Embodiments are directed to a plate structure and a method of manufacturing the same.

The embodiments may be realized by providing a plate structure including a first plate; an optical laminate on the first plate, the optical laminate including an optical plate on the first plate and a film dam along a top periphery of the optical plate; a second plate on the optical laminate; and a resin layer in a space provided by the film dam, the resin layer attaching the optical plate to the second plate.

The first plate may be a display panel.

The second plate may be a cover window or touch panel.

The optical plate may be a polarizing plate, and the film dam may be formed by removing a part of a protective film on the optical plate.

The film dam may include a light transmitting material, and the resin layer may include a photocurable resin.

One end of the film dam and another end of the film dam may be spaced apart from each other.

At least a part of the resin layer may be between the one end of the film dam and the other end of the film dam.

The plate structure may further include a third plate on the second plate; an upper resin layer that attaches the second plate to the third plate; and a tape dam along a side periphery of the upper resin layer.

The tape dam may be attached to one surface of the third plate, the one surface of the third plate facing the second plate.

One end of the tape dam and another end of the tape dam may be spaced apart from each other.

At least a part of the resin layer may be between the one end of the tape dam and the other end of the tape dam.

The first plate may be a display panel, the second plate may be a touch panel, and the third plate may be a cover window.

The embodiments may be realized by providing a plate structure including a first plate; a second plate on the first plate; a resin layer that attaches the first plate to the second plate; and a tape dam on a side periphery of the resin layer, the tape dam being attached to a surface of the second plate that faces the first plate.

The first plate may include one of a display panel, a touch panel, or a cover window, and the second plate may include another of the display panel, the touch panel, the cover window.

The tape dam may include a light transmitting material, and the resin layer may include a photocurable resin.

One end of the tape dam and another end of the tape dam may be spaced apart from each other, and at least a part of the resin layer may be between the one end of the tape dam and the other end of the tape dam.

The embodiments may be realized by providing a method of manufacturing a plate structure that includes a first plate and a second plate, the method including providing an optical structure that includes an optical plate and a protective film on the optical plate; pressing the optical plate of the optical structure on the first plate; forming an optical laminate such that the optical laminate includes the optical plate and a film dam on a top periphery of the optical plate; coating resin in a space provided by the film dam; attaching the second plate onto the optical laminate using the resin; and curing the resin.

The protective film may include a first portion on a top periphery of the optical plate, a second portion different from the first portion, and a cutting line between the first portion and the second portion, and forming the optical laminate includes removing the second portion of the protective film.

The second portion may include a first pattern on the optical plate except for the top periphery, a knob pattern, and a second pattern on the top periphery of the optical plate, the second pattern connecting the first pattern to the knob pattern, and forming the optical laminate may include removing the second portion by using the knob pattern.

The embodiments may be realized by providing a method of manufacturing a plate structure that includes a first plate and a second plate, the method including attaching a tape dam onto a top periphery of the second plate; coating resin in a space provided by the tape dam; attaching the first plate onto the second plate using the resin; and curing the resin.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
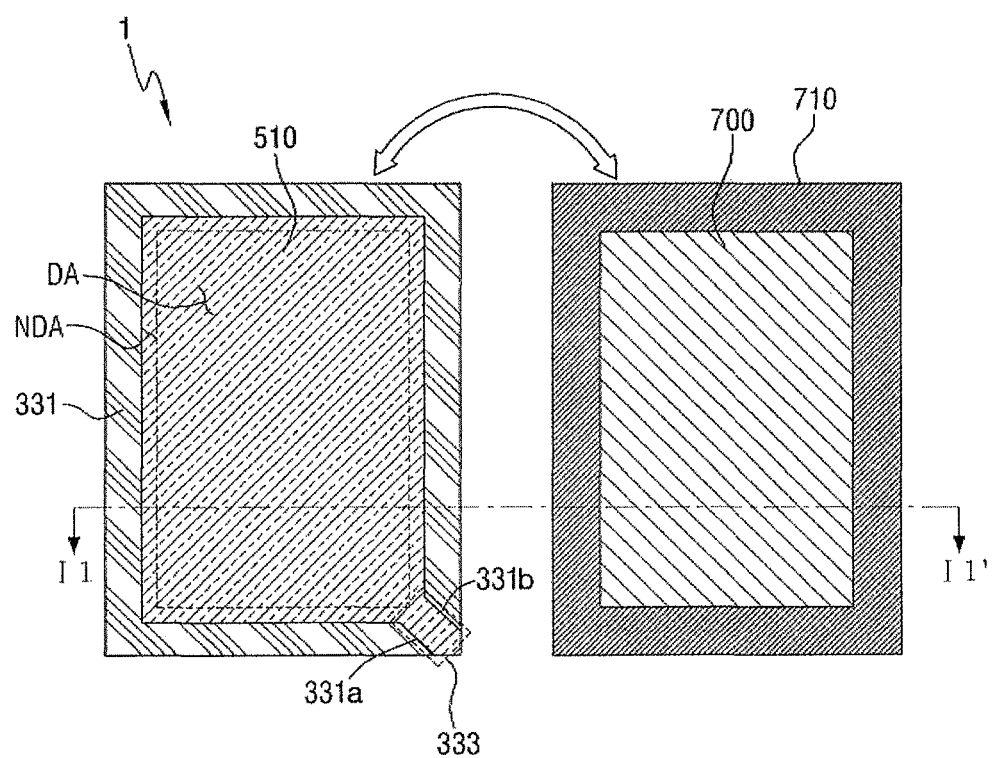
FIG. 1 illustrates a partially exploded plan view of a plate structure according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element or layer is referred to as being "on" another element or layer, it can be directly on the other element or layer or intervening elements or layers may be present.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, the term, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
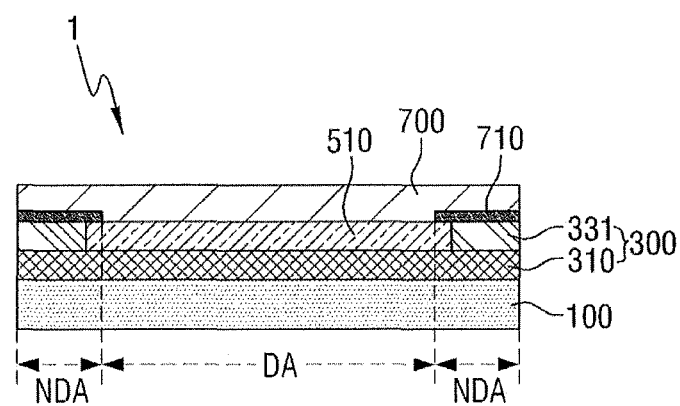
FIG. 2 illustrates a cross-sectional view of the plate structure taken along line I1-I1' of FIG. 1.

FIG. 1 illustrates a partially exploded plan view of a plate structure according to one embodiment. FIG. 2 illustrates a cross-sectional view of the plate structure taken along line I1-I1' of FIG. 1. The plate structure according to an embodiment may include a first plate and a second plate. In an implementation, the first plate may be, e.g., a display panel, and the second plate may be, e.g., a cover window. In an implementation, the first plate may be different from the second plate.

Referring to FIGS. 1 and 2, a plate structure 1 according to the present embodiment may include a display panel 100 (e.g., the first plate), an optical laminate 300 (including an optical plate 310 and a film dam 331) on the display panel 100, a cover window 700 (e.g., the second plate) on the optical laminate 300, and a resin layer 510 between the cover window 700 and the optical plate 310 of the optical laminate 300 to bond the optical plate 310 to the cover window 700.

The display panel 100 may display an image. In an implementation, a self-luminous display panel such as an organic light emitting device (OLED) panel may be used as the display panel 100. In an implementation, a non-luminescent display panel such as a liquid crystal display (LCD) panel, an electrophoretic display (EPD) panel or an electrowetting display (EWD) panel may be used as the display panel 100. In the case of using a non-luminescent display panel as the display panel 100, a backlight unit for supplying light to the display panel 100 may be further included on or below the display panel 100.

The optical laminate 300 may be on the display panel 100. The optical laminate 300 may include the optical plate 310 and the film dam 331.

In an implementation, the optical plate 310 may be a polarizing plate. The polarizing plate may help prevent a reduction in image display performance of the display panel 100, which may be caused by reflection of light (e.g., "outside light") that is incident from the outside. For example, the polarizing plate may include a polarization film (not shown) having a polarization axis in a specific direction and a retardation film (not shown) having a phase difference of ¼λ. The polarizing plate may help prevent the reduction in image display performance of the display panel 100, which may be caused by the reflection of the outside light, by converting the outside light into a circularly polarized state.

The film dam 331 may be along a top periphery of the optical plate 310. For example, the optical plate 310 may be between the film dam 331 and the display panel 100. The film dam 331 may serve as a barrier for preventing a part of the resin layer 510 from flowing out in a process of forming the resin layer 510 or a process of attaching (or bonding or adhering) the optical plate 310 to the cover window 700.

The film dam 331 may be formed by removing a part of a protective film on the optical plate 310. For example, if the optical plate 310 is a polarizing plate, the film dam 331 may be formed by removing a part of a polarizing plate protective film on the optical plate 310.

In an implementation, a suitable material for a protective film may be used as or included in the film dam 331. For example, the film dam 331 may include an acryl-based, cellulose-based, polyolefin-based or polyester-based material or the like. In an implementation, the film dam 331 may include, e.g., acryl-based resin such as polymethyl methacrylate and polyethyl methacrylate; polyester-based resin such as polyethylene terephthalate, polyethylene isophthalate, polyethylene naphthalate and polybutylene terephthalate; cellulose-based resin such as diacetyl cellulose and triacetyl cellulose; polyolefin-based resin such as a polyolefin-based ethylene-propylene copolymer having a polyethylene, polypropylene, cyclo-based, or norbornene structure; or the like.

In an implementation, the film dam 331 may be formed of or may include a light transmitting material or transparent material. In an implementation, the film dam 331 may be formed of or may include a light shielding material, if desired.

In an implementation, one end 331a of the film dam 331 and another end 331b of the film dam 331 may be spaced apart from each other. For example, the film dam 331 may continuously extend from the one end 331a at one corner of the plate structure, along a periphery of the plate structure, and terminate at the other end 331b at the one corner of the plate structure, without the one end 331a contacting the other end 331b at the one corner. For example, the film dam 331 may discontinuously surround or extend along the periphery of the optical plate 310. In an implementation, in a process of forming the resin layer 510 or a process of attaching (or bonding or adhering) the optical plate 310 to the cover window 700, a gas, e.g., air, may be discharged to the outside through a spaced portion 333. For example, the spaced portion 333 may be a passage through which a gas is discharged to the outside in a process of forming the resin layer 510. For example, the spaced portion 333 may be between the one end 331 of the film dam 331 and the other end 331b of the film dam 331 at the one corner of the plate structure. In an implementation, if resin were to be excessively supplied in a process of forming the resin layer 510, the spaced portion 333 may be a passage through which a part of the excessively supplied resin may be discharged to the outside. In an implementation, the film dam 331 may have a structure in which the one end 331a and the other end 331b are in contact, e.g., in direct contact, with one another without being spaced from each other.

The cover window 700 may be on a side of the plate structure in a direction in which an image is emitted or displayed from the display panel 100. For example, the cover window 700 may be on the optical laminate 300. The cover window 700 may be made of or may include a transparent material, e.g., glass or polymer plastic. In an implementation, the polymer plastic may include, e.g., polymethyl methacrylate (PMMA) or polycarbonate.

The cover window 700 may define, on the plane, a display area DA (in or through which an image generated from the display panel 100 is provided to the outside), and a non-display area NDA (in or at which an image generated from the display panel 100 is not provided to the outside). For example, the display area DA may be an area through which an image generated from the display panel 100 is transmitted, and the non-display area NDA may be an area through which an image generated from the display panel 100 is not transmitted.

The cover window 700 may include a light shielding pattern 710 in a portion corresponding to or overlying the non-display area NDA. The light shielding pattern 710 may include a material capable of blocking light. In an implementation, the light shielding pattern 710 may include a metal material with low reflectivity, e.g., chromium (Cr) or molybdenum (Mo). In an implementation, the light shielding pattern 710 may include an opaque inorganic insulating material, e.g., $CrO_x$ or $MoO_x$. In an implementation, the light shielding pattern 710 may include an opaque organic insulating material, e.g., black resin.

The resin layer 510 may be in a space above the optical plate 310 and provided by the film dam 331. For example, the film dam 331 may be on an edge of the resin layer 510. For example, the resin layer 510 may be between the optical plate 310 and the cover window 700 to attach (or bond or adhere) the optical plate 310 to the cover window 700. The resin layer 510 may be made of or may include a highly light-transmissive resin. In an implementation, the resin layer 510 may be made of or may include optically clear resin (OCR). In an implementation, the resin layer 510 may be made of or may include a material having an optical refractive index that is identical or similar to that of the cover window 700, such that the optical properties may be maintained even after the cover window 700 is attached. In an implementation, the resin layer 510 may be made of or may include a photocurable resin (e.g., ultraviolet curing resin), and/or may be made of or may include a thermosetting resin.

The above-described plate structure 1 may help prevent an overflow of resin in a process of forming the resin layer 510. In an implementation, a process of forming a separate dam may be omitted by using a part of the protective film on the optical plate 310 as the film dam 331 to help prevent the overflow of resin. Thus, material costs may be reduced by using, as the film dam 331, a typical protective film that is then partially removed.

Figure 3:
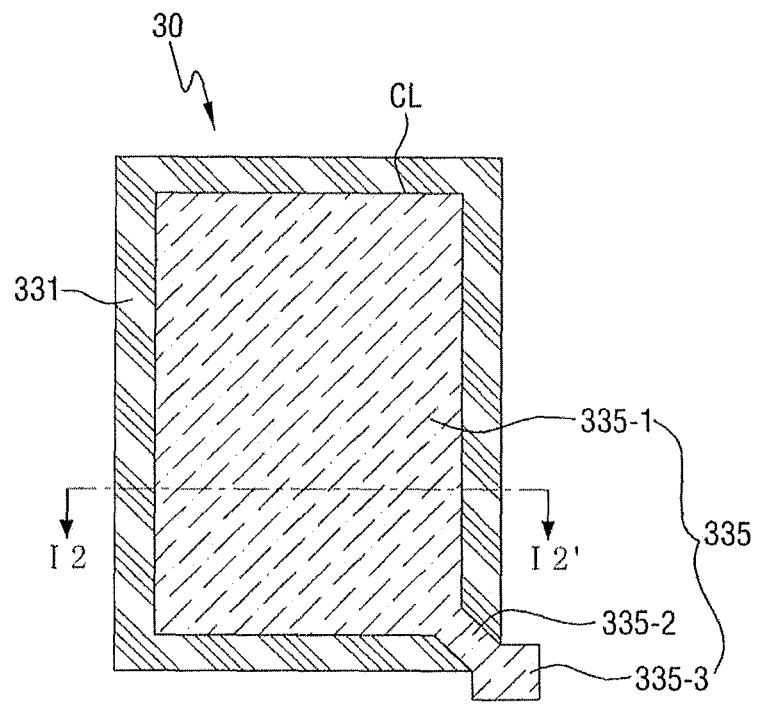
FIG. 3 illustrates a plan view of a stage in a method of manufacturing the plate structure shown in FIGS. 1 and 2.
Figure 4:
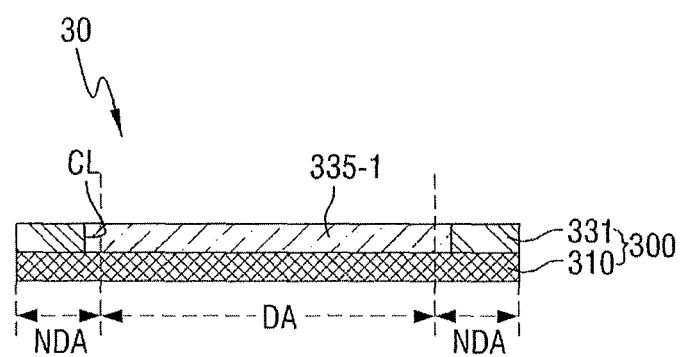
FIG. 4 illustrates a cross-sectional view taken along line I2-I2' of FIG. 3.

FIG. 3 illustrates a plan view of a stage in a method of manufacturing the plate structure shown in FIGS. 1 and 2. FIG. 4 illustrates a cross-sectional view taken along line I2-I2' of FIG. 3. For example, FIGS. 3 and 4 illustrate a plan view and a cross-sectional view of the optical structure before removing a part of the protective film from the optical laminate shown in FIGS. 1 and 2.

Referring to FIGS. 1 to 4, first, as shown in FIGS. 3 and 4, an optical structure 30 including an optical plate 310 and a protective film 331 and 335 laminated on the optical plate 310 may be provided.

The protective film 331 and 335 on the optical plate 310 may include a first portion (on a top periphery of the optical plate 310 and which will end up being formed as the film dam 331), and a second portion 335 (except for or different from the film dam 331 or the first portion). A cutting line CL may be between the first portion and the second portion 335 and defining the film dam 331.

The first portion of the protective film that forms the film dam 331 may be on the top periphery of the optical plate 310, and may be in a portion overlapping the non-display area NDA.

The second portion 335 may include a first pattern 335-1, a second pattern 335-2 and a knob pattern 335-3.

The first pattern 335-1 may be a portion of the second portion 335 that is surrounded by the first portion (forming the film dam 331). The first pattern 335-1 may be, e.g., a portion on an interior or central region of the optical plate 310, except for the top periphery of the optical plate 310 (which includes the first portion 331 thereon).

The knob pattern 335-3 may be a portion of the second portion 335 that facilitates removal of the second portion 335. In an implementation, the knob pattern 335-3 may protrude outwardly from the optical plate 310 on the plane.

The second pattern 335-2 may be a portion of the second portion 335 that connects the first pattern 335-1 to the knob pattern 335-3. The second pattern 335-2 may be on the top periphery of the optical plate 310 (e.g., between the one end and the other end of the film dam 331). In an implementation, the second pattern 335-2 may be on the corner or corner side of the optical plate 310.

Figure 5:
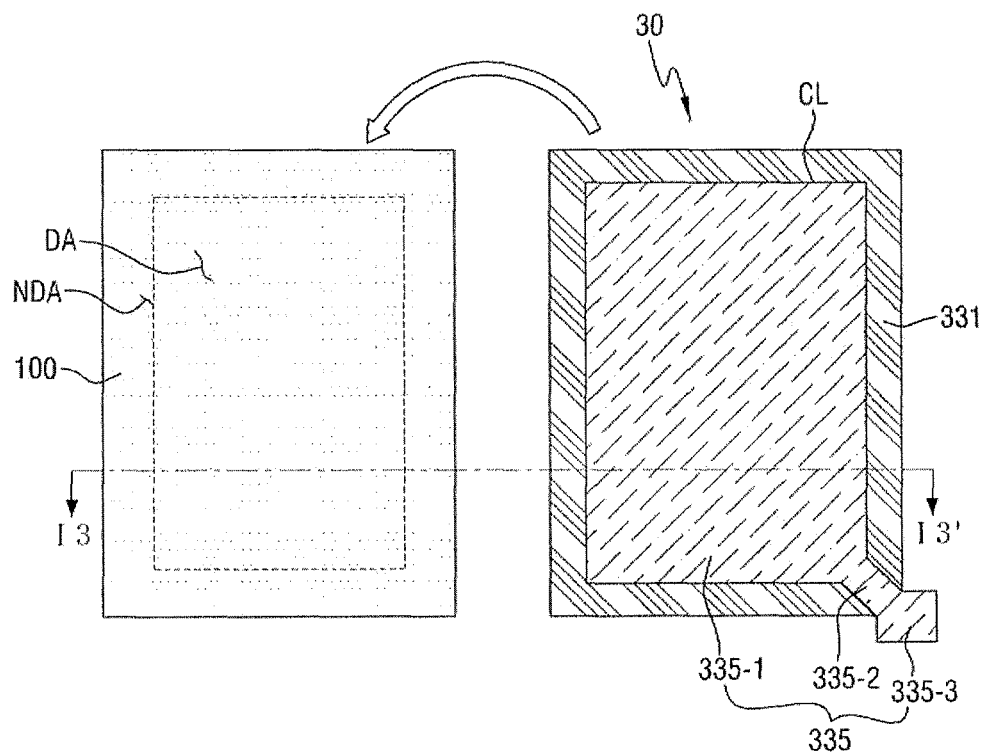
FIG. 5 illustrates a plan view of a stage in a method of manufacturing the plate structure shown in FIGS. 1 and 2.
Figure 6:
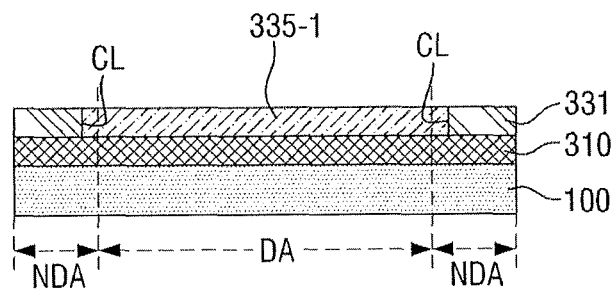
FIG. 6 illustrates a cross-sectional view of the structure shown in FIG. 5 taken along line I3-I3' of FIG. 5.

FIG. 5 illustrates a plan view of a stage in a method of manufacturing the plate structure shown in FIGS. 1 and 2. FIG. 6 illustrates a cross-sectional view of the structure shown in FIG. 5 taken along line I3-I3' of FIG. 5. For example, FIG. 6 illustrates a cross-sectional view of a process of stacking the optical structure shown in FIGS. 3 and 4 on a display panel.

Referring to FIGS. 1 to 6, and as shown in FIGS. 5 and 6, the optical structure 30 may be on the display panel 100, e.g., the first plate. For example, the optical plate 310 and the display panel 100 may be bonded to each other. Although not shown in the drawing, a separate adhesive may be between the optical plate 310 and the display panel 100. In an implementation, a lower surface of the optical plate 310 itself may have adhesive property. For example, the optical plate 310 may be bonded to the display panel 100 without a separate adhesive.

Figure 7:
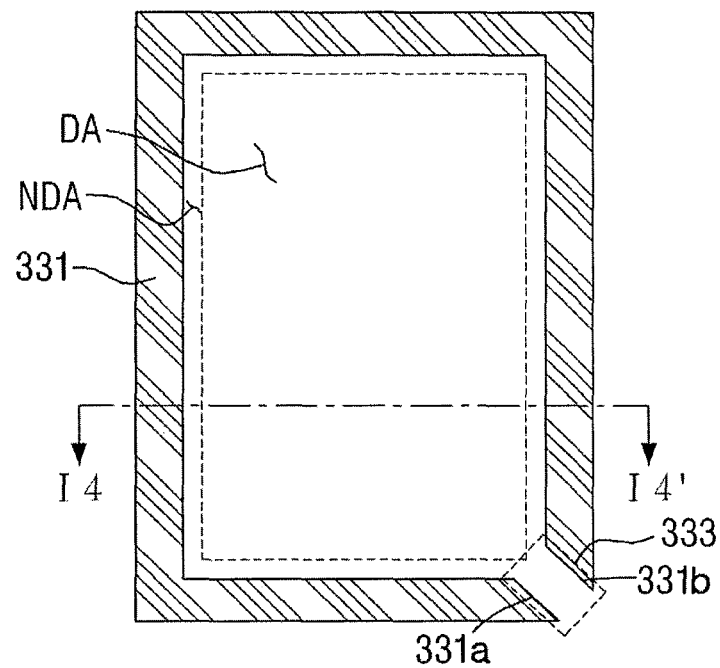
FIG. 7 illustrates a plan view of a stage in a method of manufacturing the plate structure shown in FIGS. 1 and 2.
Figure 8:
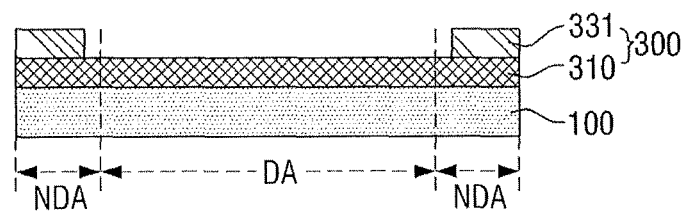
FIG. 8 illustrates a cross-sectional view of the structure shown in FIG. 7 taken along line I4-I4' of FIG. 7.

FIG. 7 illustrates a plan view of a stage in a method of manufacturing the plate structure shown in FIGS. 1 and 2. FIG. 8 illustrates a cross-sectional view of the structure shown in FIG. 7 taken along line I4-I4' of FIG. 7. For example, FIG. 8 illustrates a cross-sectional view showing a process of removing a part of the protective film from the optical structure shown in FIGS. 5 and 6.

Referring to FIGS. 1 to 8, and as shown in FIGS. 7 and 8, the optical laminate 300 may be formed by removing the second portion 335 from the protective film 331 and 335, after the optical structure 30 is provided on the display panel 100. Using the knob pattern 335-3 when removing the second portion 335 may facilitate the removal of the second portion 335, e.g., the second portion 335 may be peeled and removed from the optical plate 310 with a smaller force. For example, the knob pattern 335-3 may be grabbed or used as a starting point for peeing off the second portion 335.

The first portion (e.g., a portion of the protective film 331 and 335 except for the second portion 335) may form the film dam 331 as described above. In an implementation, in a case where the second portion 335 includes the second pattern 335-2, the one end 331a and the other end 331b of the film dam 331 may be spaced apart from each other by the removal of the second portion 335. The spaced portion 333 formed by the removal of the second portion 335 may be a passage through which a gas or excessively supplied resin may be discharged, in the process of forming resin as described above.

Figure 9:
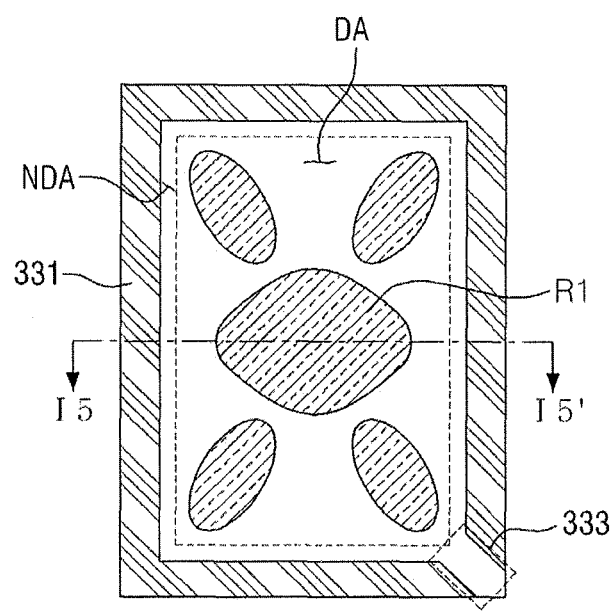
FIG. 9 illustrates a plan view of a stage in a method of manufacturing the plate structure shown in FIGS. 1 and 2.
Figure 10:
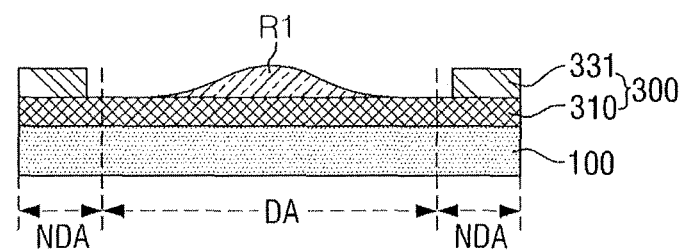
FIG. 10 illustrates a cross-sectional view of the structure shown in FIG. 9 taken along line I5-I5' of FIG. 9, FIGS. 11 and 12 illustrate cross-sectional views of stages in a method of manufacturing the plate structure shown in FIGS. 1 and 2.

FIG. 9 illustrates a plan view of a stage in a method of manufacturing the plate structure shown in FIGS. 1 and 2. FIG. 10 illustrates a cross-sectional view of the structure shown in FIG. 9 taken along line I5-I5' of FIG. 9. For example, FIG. 10 illustrates a diagram showing a process of coating resin on the structure shown in FIGS. 7 and 8.

Referring to FIGS. 1 to 10, and as shown in FIGS. 9 and 10, resin R1 may be coated in a space provided by the film dam 331 and on or above the optical plate 310 (e.g., a space formed by removing the second portion). The resin R1 may be liquid resin having a viscosity. The resin R1 may be or may include a light-transmissive resin, e.g., the resin R1 may be or may include a photocurable resin or thermosetting resin. Since the other description of the resin R1 is the same as described above with reference to FIGS. 1 and 2, repeated descriptions thereof may be omitted.

Figure 11:
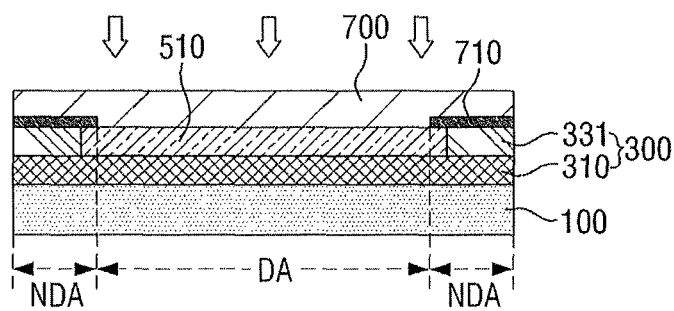
Figure 12:
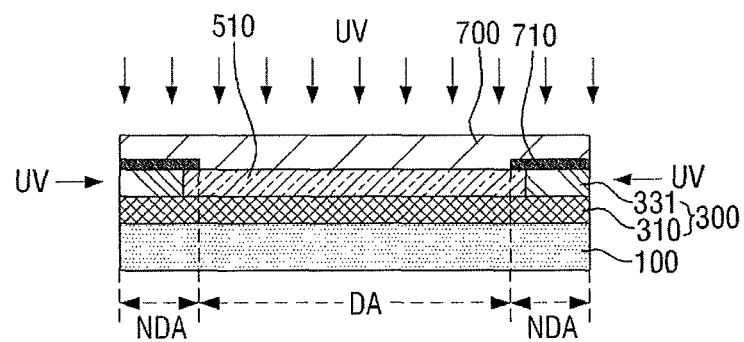

FIGS. 11 and 12 illustrate cross-sectional views of stages in a method of manufacturing the plate structure shown in FIGS. 1 and 2. For example, FIGS. 11 and 12 illustrate diagrams showing a process of forming a resin layer on the structure shown in FIGS. 9 and 10.

Referring to FIGS. 1 to 12, and as shown in FIG. 11, after the cover window 700 (e.g., the second plate) is provided on the optical laminate 300, the cover window 700 may be pressed in a direction toward the optical laminate 300. For example, the resin R1 may be spread in the space provided by the film dam 331 to form the resin layer 510. Then, the resin layer 510 may be bonded (or attached or adhered) to the cover window 700 and the optical plate 310.

The spaced portion 333 (formed by or between the one end 331a and the other end 331b spaced apart from each other) may be present in the film dam 331. Accordingly, a part of any excessively supplied or coated resin R1 may be discharged compulsorily or forced through the spaced portion 333. The spaced portion 333 may be located in a specific region, and the resin R1 discharged through the spaced portion 333 may be easily removed. Further, a part of the excessively supplied or coated resin R1 may be discharged through the spaced portion 333, and a part of the resin R1 may remain in the spaced portion 333. For example, at least a part of the resin layer 510 may be located in or remain in the spaced portion 333.

Then, as shown in FIG. 12, the resin layer 510 may be cured by irradiating ultraviolet light (UV) or heat to the resin layer 510.

In a case where the resin layer 510 is made of or includes a photocurable resin (e.g., an ultraviolet curing resin), ultraviolet light UV may be provided to cure the resin layer 510. The ultraviolet light UV may be provided from or at an upper side of the cover window 700. In a case where the film dam 331 is made of or includes a light transmitting material, as shown in FIG. 12, the ultraviolet light UV may also be provided from or at the outside of, e.g., sides of, the film dam 331. In this case, there may be an advantage that a portion of the resin layer 510 overlapping the light shielding pattern 710 may be more readily cured.

Figure 13:
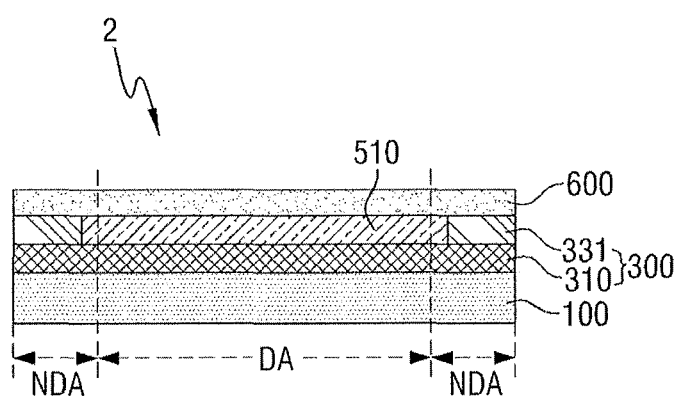
FIG. 13 illustrates a cross-sectional view of a plate structure according to another embodiment.

FIG. 13 illustrates a cross-sectional view of a plate structure according to another embodiment.

Referring to FIGS. 1, 2 and 13, a plate structure 2 according to the present embodiment may include a second plate, e.g., a structure may be different from that of the plate structure 1 shown in FIGS. 1 and 2.

For example, the plate structure 2 according to the present embodiment may include a display panel 100 (e.g., a first plate), an optical laminate 300 on the display panel 100 and including an optical plate 310 and a film dam 331, a touch panel 600 (e.g., a second plate) on the optical laminate 300, and a resin layer 510 between the touch panel 600 and the optical plate 310 of the optical laminate 300 and bonding the optical plate 310 to the touch panel 600.

In an implementation, the touch panel 600 may sense a touch through various suitable methods, e.g., a capacitive overlay method, a resistive or registive overlay method, an infrared beam method, an integral strain gauge method, a surface acoustic wave method, a piezo electric method, or the like.

For example, the plate structure 2 according to the present embodiment may be different from the plate structure 1 described with reference to FIGS. 1 and 2 in that the plate structure 2 may include the touch panel 600 as a second plate, and other configurations or elements of the plate structure 2 may be the same as those of the plate structure 1. Thus, since the description of the configurations other than the above difference is the same as that of the description of FIGS. 1 and 2, repeated descriptions may be omitted.

Figure 14:
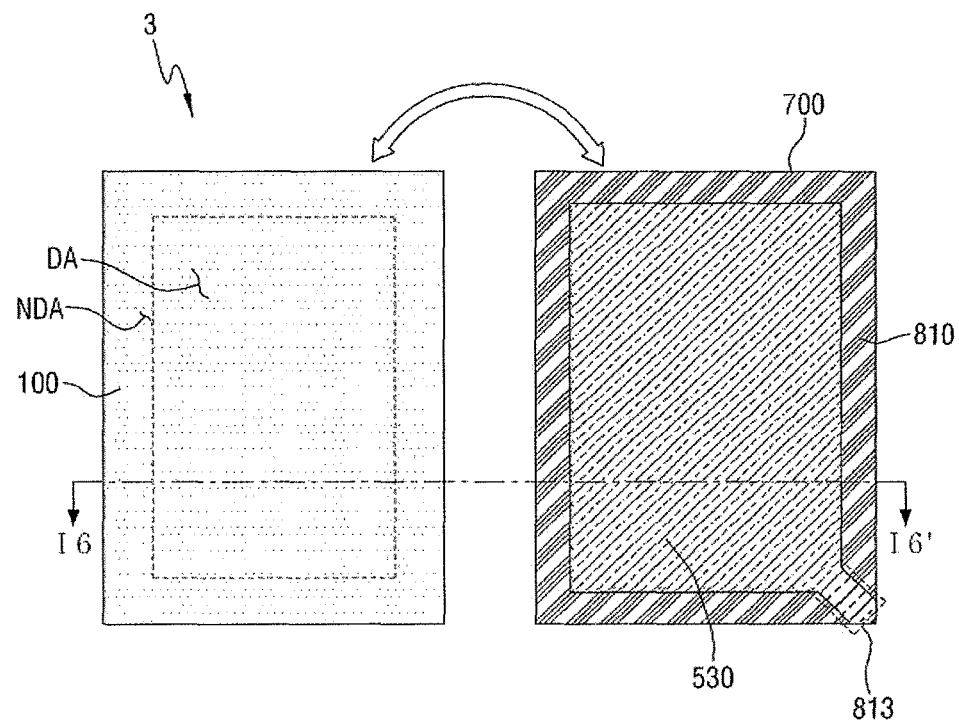
FIG. 14 illustrates a partially exploded plan view of a plate structure according to still another embodiment.
Figure 15:
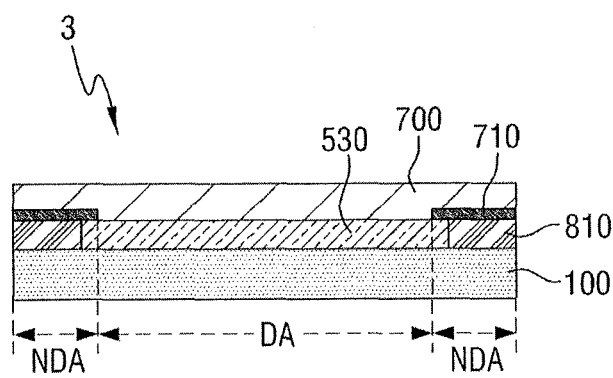
FIG. 15 illustrates a cross-sectional view of the plate structure taken along line I6-I6' of FIG. 14.

FIG. 14 illustrates a partially exploded plan view of a plate structure according to still another embodiment. FIG. 15 illustrates a cross-sectional view of the plate structure taken along line I6-I6' of FIG. 14.

Referring to FIGS. 14 and 15, a plate structure 3 according to the present embodiment may include a display panel 100 (e.g., a first plate), a cover window 700 (e.g., the second plate) on the display panel 100, a resin layer 530 attaching the display panel 100 to the cover window 700, and a tape dam 810 along a side periphery of the resin layer 530 and attached to a lower surface of the cover window 700. For example, the tap dam 810 may be between the cover window 700 and the display panel 100. Since the description of the display panel 100 and the cover window 700 is the same as described above with reference to FIGS. 1 and 2, a repeated description thereof may be omitted.

The tape dam 810 may be along the periphery of the cover window 700. For example, the tape dam 810 may be along the periphery of the cover window 700 and may overlap with the light shielding pattern 710 and/or the non-display area NDA.

The tape dam 810 may be attached to the cover window 700 along the periphery of the cover window 700. At least one surface of the tape dam 810 may have an adhesive property, and one surface of the tape dam 810 having adhesive property may be attached to the cover window 700.

In an implementation, one end 810*a* of the tape dam 810 and another end 810*b* of the tape dam 810 may be spaced apart from each other. For example, in a process of forming the resin layer 530 or a process of attaching (or bonding or adhering) the display panel 100 to the cover window 700, a gas (such as air) may be discharged to the outside through a spaced portion 813 between the one end 810*a* and the other end 810*b* of the tape dam 810 that are spaced apart from each other. For example, the spaced portion 813 may be a passage through which a gas may be discharged to the outside in a process of forming the resin layer 530. In an implementation, if resin were to be excessively supplied in a process of forming the resin layer 530, the spaced portion 813 may be a passage through which a part of the excessively supplied resin may be discharged to the outside. In an implementation, the tape dam 810 may have a structure in which the one end 331*a* and the other end 331*b* are in contact, e.g., direct contact, without being spaced apart from each other.

In an implementation, the tape dam 810 may be formed of or may include a light transmitting material or transparent material. In an implementation, the tape dam 810 may be formed of or may include a light shielding material, if desired.

The resin layer 530 may be in a space between the display panel 100 and the cover window 700, e.g., in a space provided or bounded by the tape dam 810. For example, the tape dam 810 may be on an edge of the resin layer 530. The resin layer 530 may be between the display panel 100 and the cover window 700 to attach (or bond or adhere) the optical plate 310 to the cover window 700. The resin layer 530 may be made of or may include a highly light-transmissive resin. In an implementation, the resin layer 530 may be made of or may include an optically clear resin (OCR). In an implementation, the resin layer 530 may be made of or may include a material having an optical refractive index that is identical or similar to that of the cover window 700, such that the optical properties may be maintained even after the cover window 700 is attached. In an implementation, the resin layer 530 may be made of or may include a photocurable resin (e.g., ultraviolet curing resin) and/or may be made of or may include a thermosetting resin.

The above-described plate structure 3 including the tape dam 810 may help prevent overflow of resin in a process of forming the resin layer 530.

Figure 16:
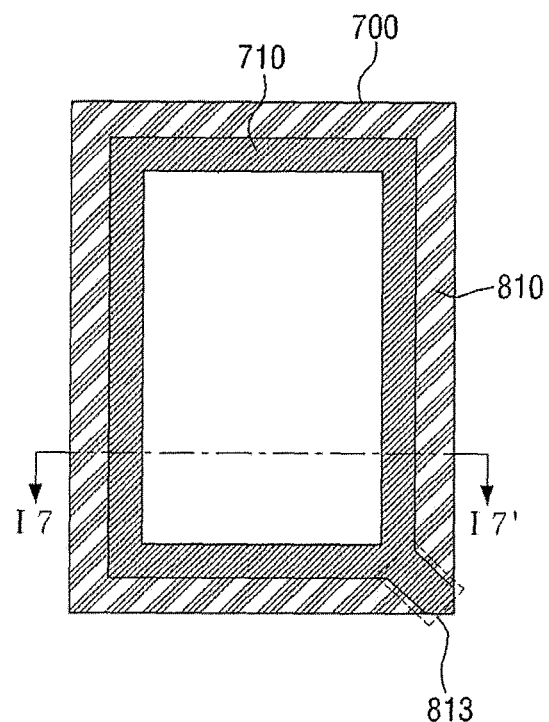
FIG. 16 illustrates a plan view of a stage in a method of manufacturing the plate structure shown in FIGS. 14 and 15.
Figure 17:
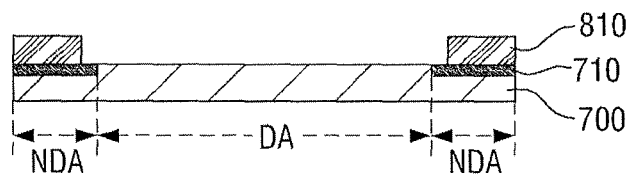
FIG. 17 illustrates a cross-sectional view of the structure of FIG. 16 taken along line I7-I7' of FIG. 16.

FIG. 16 illustrates plan view of a stage in a method of manufacturing the plate structure shown in FIGS. 14 and 15. FIG. 17 illustrates a cross-sectional view of the structure of FIG. 16 taken along line I7-IT of FIG. 16.

Referring to FIGS. 14 to 17, first, as shown in FIGS. 16 and 17, the tape dam 810 may be formed by taping the periphery of one surface of the cover window 700. As described above, the tape dam 810 may be attached to the cover window 700 to overlap with the light shielding pattern 710 and/or the non-display area NDA.

The one end 810*a* of the tape dam 810 and the other end 810*b* of the tape dam 810 may be spaced apart from each other. For example, the spaced portion 813 may be formed by a method of taping an entire periphery of one surface of the cover window 700, and then removing a part of the tape. In an implementation, the spaced portion 813 may be formed by a method of attaching the tape dam 810 in which the one end 810*a* and the other end 810*b* are spaced apart from each other to the cover window 700, without a separate removal step.

Figure 18:
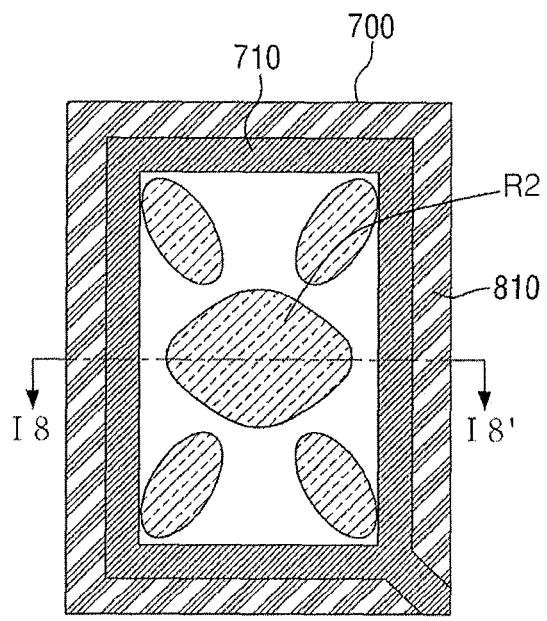
FIG. 18 illustrates a plan view of a stage in a method of manufacturing the plate structure shown in FIGS. 14 and 15.
Figure 19:
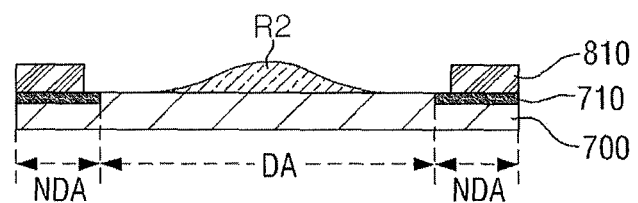
FIG. 19 illustrates a cross-sectional view of the structure shown in FIG. 18 taken along line I8-I8' of FIG. 18.

FIG. 18 illustrates a plan view of a stage in a method of manufacturing the plate structure shown in FIGS. 14 and 15. FIG. 19 illustrates a cross-sectional view of the structure shown in FIG. 18 taken along line I8-I8' of FIG. 18. For example, FIG. 19 illustrates a diagram showing a process of coating resin on the structure shown in FIGS. 16 and 17.

Referring to FIGS. 14 to 19, and as shown in FIGS. 18 and 19, resin R2 may be coated in a space provided or bounded by the tape dam 810 on one surface of the cover window 700. The resin R2 may be liquid resin having a viscosity. The resin R2 may be a light-transmissive resin. In an implementation, the resin R2 may be or may include a photocurable resin or thermosetting resin. Other descriptions of the resin R2 may be the same as described above with reference to FIGS. 14 and 15, and repeated descriptions may be omitted.

Figure 20:
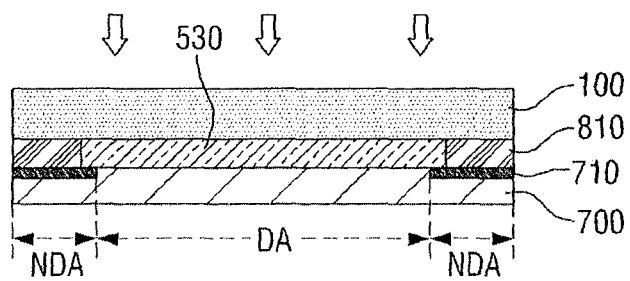
FIGS. 20 and 21 illustrate cross-sectional views of stages in a method of manufacturing the plate structure shown in FIGS. 14 and 15.
Figure 21:
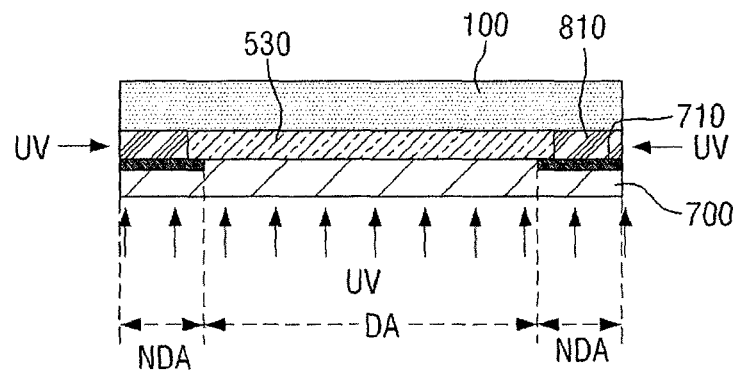

FIGS. 20 and 21 illustrate cross-sectional views of stages in a method of manufacturing the plate structure shown in FIGS. 14 and 15. For example, FIGS. 20 and 21 illustrate diagrams showing a process of forming a resin layer and a process of bonding the cover window to the display panel in the structure shown in FIGS. 18 and 19.

Referring to FIGS. 14 to 21, and as shown in FIG. 20, after the display panel 100 (e.g., a first plate) is provided on one surface of the cover window 700 (coated with resin R2), the display panel 100 may be pressed in a direction toward the cover window 700. For example, the resin R2 may be spread in the space provided or bounded by the tape dam 810 to form the resin layer 530. Then, the resin layer 530 may be bonded (or attached or adhered) to the cover window 700 and the display panel 100.

The spaced portion 813 (formed by the one end 810a and the other end 810b spaced apart from each other) may be present in the tape dam 810. Accordingly, a part of any excessively supplied or coated resin R2 may be discharged compulsorily or forced through the spaced portion 813. A part of the excessively supplied or coated resin R1 may be discharged through the spaced portion 813, and a part of the resin R2 may remain in the spaced portion 813. For example, at least a part of the resin layer 530 may be located in the spaced portion 813.

Then, as shown in FIG. 12, the resin layer 510 may be cured by irradiating ultraviolet light (UV) or heat to the resin layer 530.

In a case where the resin layer 530 is made of or includes a photocurable resin (e.g., an ultraviolet curing resin), ultraviolet light UV may be used to cure the resin layer 530. The ultraviolet light UV may be provided from or at a lower side of the cover window 700 on the basis of the drawing. In a case where the tape dam 810 is made of or includes a light transmitting material, as shown in FIG. 21, the ultraviolet light UV may also be provided from or on the outside of, e.g., at sides of, the tape dam 810. In this case, there a portion of the resin layer 530 overlapping the light shielding pattern 710 may be more readily cured.

Movement of the cover window 700 coating the resin R2 may be minimized in a process of bonding the display panel 100 to the cover window 700, and it is possible to minimize the flow of the resin R2, thereby further reducing the likelihood of and/or preventing the overflow of the resin R2.

Figure 22:
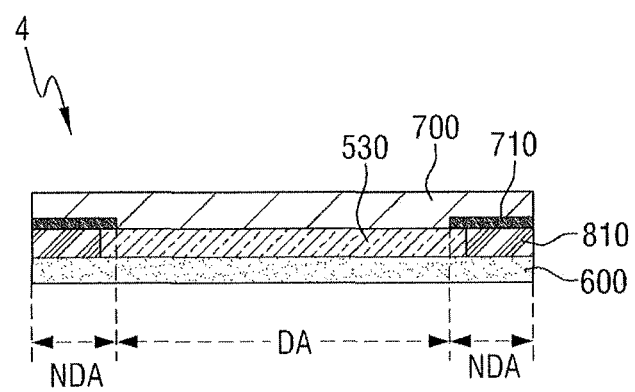
FIG. 22 illustrates a cross-sectional view of a plate structure according to still another embodiment.

FIG. 22 illustrates a cross-sectional view of a plate structure according to still another embodiment.

Referring to FIGS. 14, 15 and 22, a plate structure 4 according to the present embodiment may include a first plate, e.g., different from that of the plate structure 3 shown in FIGS. 14 and 15.

For example, the plate structure 4 according to the present embodiment may include a touch panel 600 (e.g., a first plate), a cover window 700 (e.g., a second plate) on the touch panel 600, a resin layer 530 attaching the display panel 100 to the cover window 700, and a tape dam 810 along the side periphery of the resin layer 530 and attached to the lower surface of the cover window 700.

In an implementation, the touch panel 600 may sense a touch through various suitable methods, e.g., a capacitive overlay method, a resistive or registive overlay method, an infrared beam method, an integral strain gauge method, a surface acoustic wave method, a piezo electric method, or the like, as described above with reference to FIG. 13.

For example, the plate structure 4 according to the present embodiment may be different from the plate structure 3 described above with reference to FIGS. 14 and 15 in that the plate structure 4 may include the touch panel 600 as a first plate, and other configurations or elements of the plate structure 4 may be the same as those of the plate structure 3.

Figure 23:
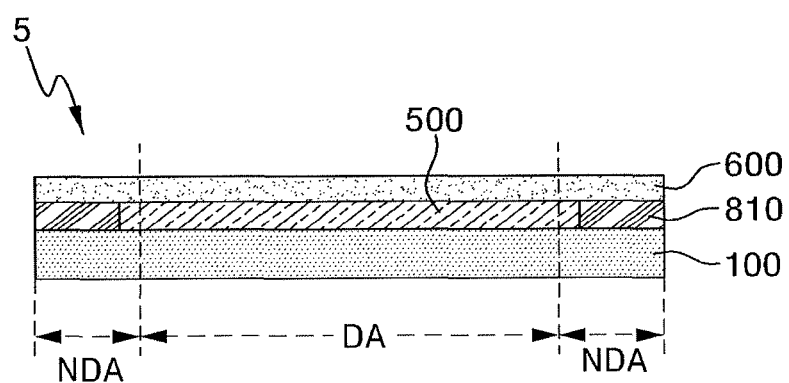
FIG. 23 illustrates a cross-sectional view of a plate structure according to still another embodiment.

FIG. 23 illustrates a cross-sectional view of a plate structure according to still another embodiment.

Referring to FIGS. 14, 15 and 23, a plate structure 5 according to the present embodiment may include a second plate that is different from that of the plate structure 3 shown in FIGS. 14 and 15.

For example, the plate structure 4 according to the present embodiment may include a touch panel 100 (e.g., a first plate), a touch panel 600 (e.g., a second plate) on the display panel 100, a resin layer 530 attaching the display panel 100 to the touch panel 600, and a tape dam 810 along the side periphery of the resin layer 530 and attached to the lower surface of the touch panel 600.

For example, the plate structure 5 according to the present embodiment may be different from the plate structure 3 described above with reference to FIGS. 14 and 15 in that the plate structure 5 may include the touch panel 600 as a second plate, and other configurations or elements of the plate structure 5 may be the same as those of the plate structure 3.

Figure 24:
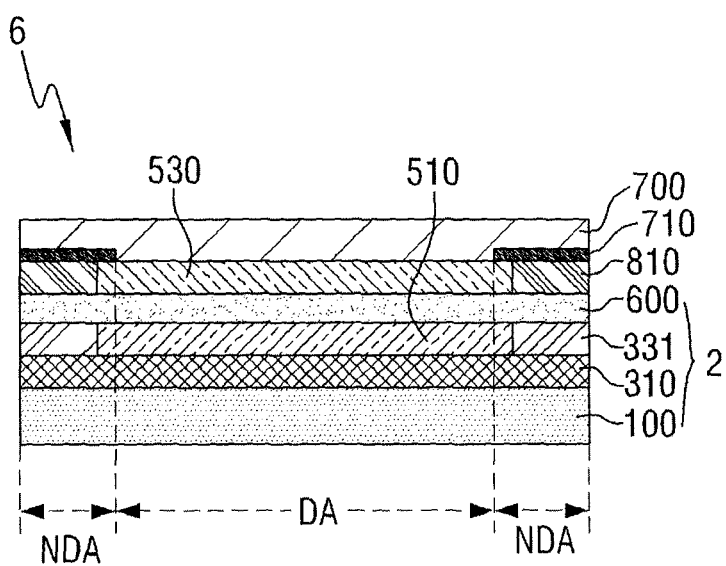
FIG. 24 illustrates a cross-sectional view of a plate structure according to still another embodiment.

FIG. 24 illustrates a cross-sectional view of a plate structure according to still another embodiment.

Referring to FIGS. 14, 15 and 24, a plate structure 6 according to the present embodiment may include a first plate that is different from that of the plate structure 3 shown in FIGS. 14 and 15.

For example, the plate structure 6 according to the present embodiment may include the plate structure 2 of FIG. 13 (serving as the first plate), a resin layer (or upper resin layer) 530 attaching the plate structure 2 to a cover window 700, and a tape dam 810 along the side periphery of the resin layer 530 and attached to a lower surface of the cover window 700.

For example, the plate structure 5 according to the present embodiment may be different from the plate structure 3 described above with reference to FIGS. 14 and 15 in that the plate structure 2 (including a display panel 100, an optical laminate 300 on the display panel 100 and including an optical plate 310 and a film dam 331), a touch panel 600 (e.g., a second plate) on the optical laminate 300, and a resin layer 510 between the touch panel 600 and the optical plate 310 of the optical laminate 300 to bond the optical plate 310 to the touch panel 600 may be used as the first plate, and other configurations or elements of the plate structure 3 may be the same as those of the plate structure 3.

For example, the first plate and the second plate may be changed to have a variety of suitable configurations. In an implementation, the first plate may include one selected from a display panel, a touch panel, or a cover window, or a structure including the selected one. For example, the second plate may be or may include another one selected from the display panel, the touch panel, and the cover window, or a structure including the selected other one.

Figure 25:
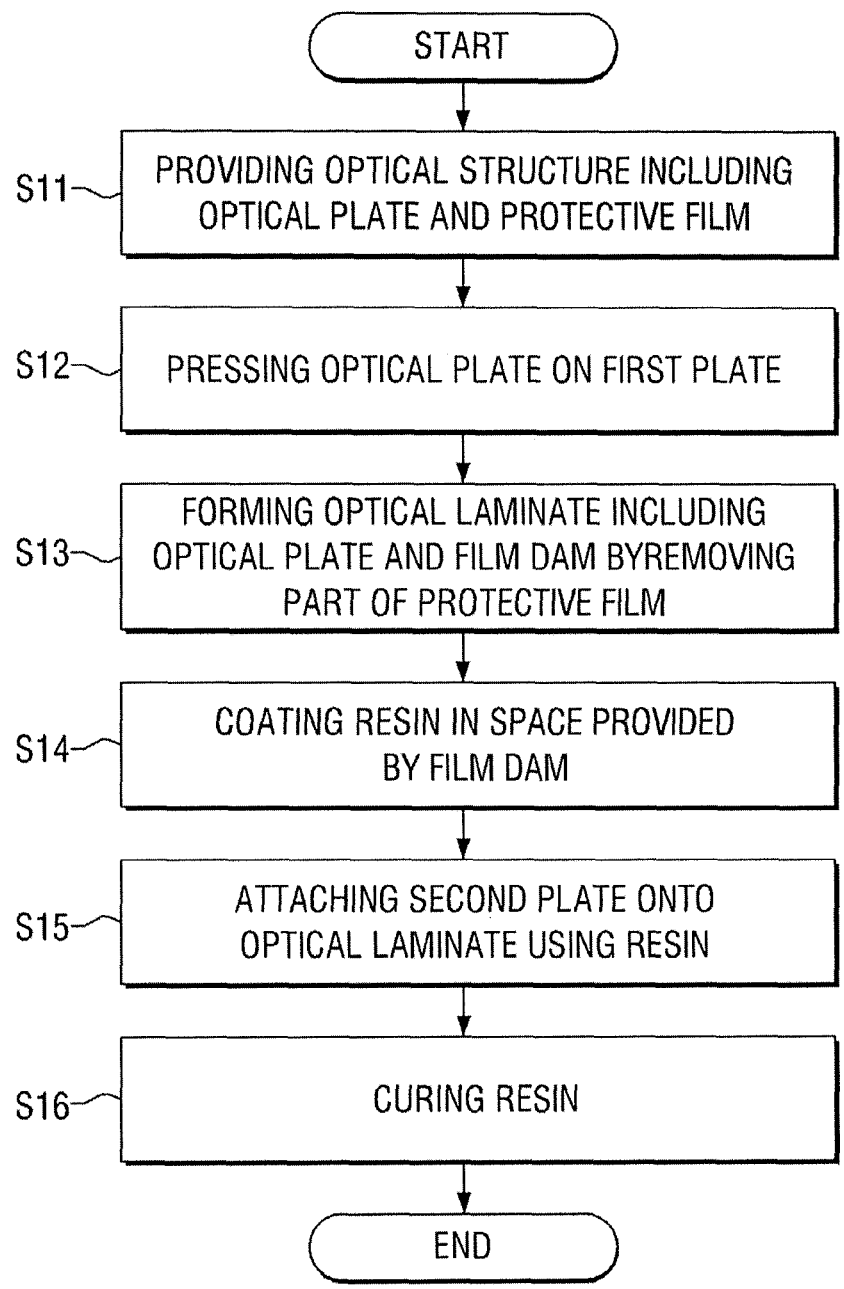
FIG. 25 illustrates a flowchart for a method of manufacturing a plate structure according to one embodiment.

FIG. 25 illustrates a flowchart of a method of manufacturing a plate structure according to one embodiment.

Referring to FIG. 25, the method of manufacturing a plate structure according to one embodiment may include providing an optical structure including an optical plate and a protective film on the optical plate (step S11), pressing the optical plate of the optical structure on the first plate (step S12), forming an optical laminate including an optical plate and a film dam on the top periphery of the optical plate by removing a part of the protective film (step S13), coating resin in a space provided by the film dam (step S14), attaching a second plate onto the optical laminate using resin (step S15), and curing the resin (step S16).

The description of the optical structure that is provided in step S11 may be the same as the above description with reference to FIGS. 3 and 4, and the process of step S12 may be identical or similar to that of the above description with reference to FIGS. 5 and 6. The process of step S13 may be identical to that of the above description with reference to FIGS. 7 and 8, and the process of step S14 may be identical to that of the above description with reference to FIGS. 9 and 10. The description of steps S15 and S16 may be identical to the above description with reference to FIGS. 11 and 12, and a detailed description thereof may be omitted.

Figure 26:
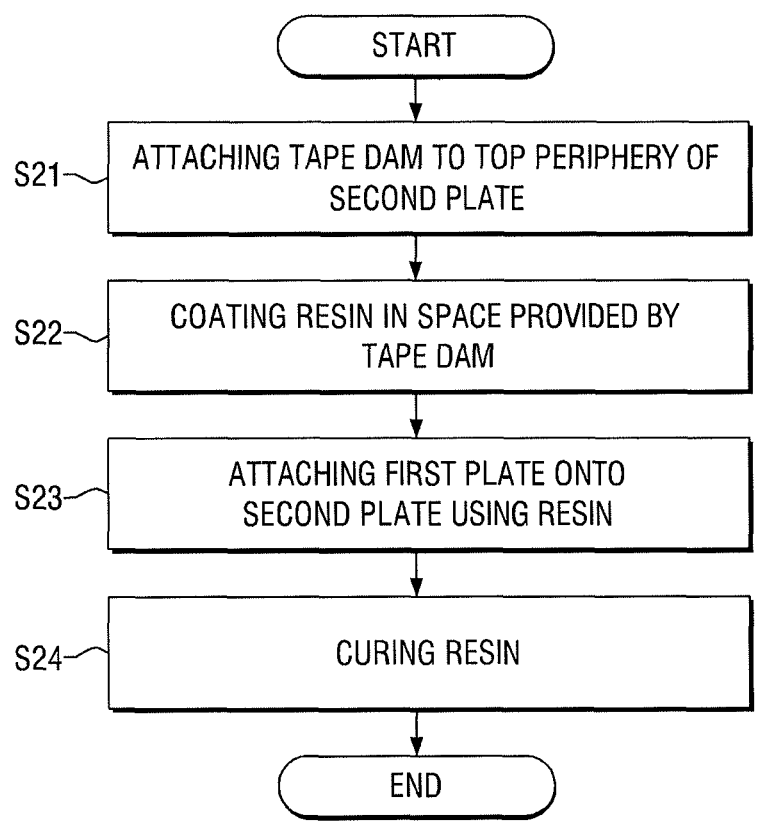
FIG. 26 illustrates a flowchart for a method of manufacturing a plate structure according to another embodiment.

FIG. 26 illustrates a flowchart of a method of manufacturing a plate structure according to another embodiment.

Referring to FIG. 26, the method of manufacturing a plate structure according to another embodiment may include attaching a tape dam to the top periphery of a second plate (step S21), coating resin in a space provided by the tape dam (step S22), attaching a first plate onto the second plate using resin (step S23), and curing the resin (step S24).

The process of step S21 may be identical or similar to that of the above description with reference to FIGS. 16 and 17, and the process of step S22 may be identical or similar to that of the above description with reference to FIGS. 18 and 19. The description of steps S23 and S24 may be identical or similar to the above description with reference to FIGS. 20 and 21, and a detailed description thereof may be omitted.

By way of summation and review, a display device may include a plate structure having a display panel and a cover window to protect an exposed surface of the display panel. The display panel and the cover window may be bonded to each other by using resin. If the resin is not fully cured or is excessively coated, overflow of the resin may occur.

The embodiments may provide a plate structure for a display device.

According to an embodiment, a plate structure capable of preventing the overflow of resin may be provided.

In addition, according to an embodiment, a plate structure capable of reducing manufacturing costs and simplifying the manufacturing process by using a part of the protective film as a dam that helps prevent the overflow of resin may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A plate structure, comprising:
   a first plate;
   an optical laminate on the first plate, the optical laminate including an optical plate on the first plate and a film dam continuously extending along a top periphery of the optical plate;
   a second plate on the optical laminate; and
   a resin layer in a space provided by the film dam, the resin layer attaching the optical plate to the second plate,
   wherein one end of the film dam and another end of the film dam are spaced apart from each other at one corner of the optical laminate,
   wherein the first plate is a display panel, and the optical plate is a polarizing plate, and
   wherein the film dam includes a light transmitting material and the resin layer includes a photocurable resin.

2. The plate structure as claimed in claim 1, wherein the second plate is a cover window or touch panel.

3. The plate structure as claimed in claim 1, wherein at least a part of the resin layer is between the one end of the film dam and the other end of the film dam.

4. The plate structure as claimed in claim 1, further comprising:
   a third plate on the second plate;
   an upper resin layer that attaches the second plate to the third plate; and
   a tape dam along a side periphery of the upper resin layer.

5. The plate structure as claimed in claim 4, wherein the tape dam is attached to one surface of the third plate, the one surface of the third plate facing the second plate.

6. The plate structure as claimed in claim 4, wherein one end of the tape dam and another end of the tape dam are spaced apart from each other.

7. The plate structure as claimed in claim 6, wherein at least a part of the resin layer is between the one end of the tape dam and the other end of the tape dam.

8. The plate structure as claimed in claim 4, wherein the second plate is a touch panel, and the third plate is a cover window.

9. A plate structure, comprising:
   a first plate;
   a second plate on the first plate;
   a resin layer that attaches the first plate to the second plate; and
   a tape dam continuously extending on a side periphery of the resin layer, the tape dam being attached to a surface of the second plate that faces the first plate,
   wherein one end of the tape dam and another end of the tape dam are spaced apart from each other at one corner of the second plate,
   wherein the first plate is a display panel, and the second plate is a polarizing plate, and
   wherein the tape dam includes a light transmitting material and the resin layer includes a photocurable resin.

10. The plate structure as claimed in claim 9, wherein: the second plate includes a touch panel or a cover window.

11. The plate structure as claimed in claim 9, wherein: at least a part of the resin layer is between the one end of the tape dam and the other end of the tape dam.

* * * * *